UNITED STATES PATENT OFFICE.

RUDOLPH D'HEUREUSE, OF NEW YORK, N. Y.

PROCESS FOR THE MANUFACTURE OF GLUCOSE.

SPECIFICATION forming part of Letters Patent No. 236,330, dated January 4, 1881.

Application filed April 21, 1880. (No specimens.)

*To all whom it may concern:*

Be it known that I, RUDOLPH D'HEUREUSE, of the city, county, and State of New York, have invented Improvements in Process for the Manufacture of Glucose, of which the following is a specification.

The object of this invention is the production of a purer and thereby superior article of glucose from Indian corn or other grain, and at less cost than by the ordinary modes now in use.

The invention consists, first, in freeing the corn at an early stage from the hull and germ, and in then expelling, by violent agitation, the steep-water and soluble gluten from the uncrushed grain.

The invention also consists in the removal of all deleterious sulphate of lime from the glucose by the addition, first, of oxalic acid and then of soda.

By far the largest proportion of the objectionable glutinous and oily portions of the corn are found in the germs and next to the skin of the berry, and I propose to remove these portions, which are of no value as starch material, at as early a stage as economy practically permits, and thereby to free the remainder of the corn from the bulk of the impurities which generally cause most of the subsequent trouble and work and can ordinarily only be partially removed. To this end the whole grain is steeped at the usual or somewhat raised temperature, according to prevailing local conditions, until sufficiently soaked to allow the removal of the germs and hulls by any appropriate machinery, various constructions of which have been in use for the special purpose of such separation in other industries, and any construction which economically accomplishes the work will do. The starchy portion of the corn, freed from hulls and germs, may then be subjected to further steeping, and is thereupon placed into a centrifugal machine or other suitable contrivances that will most completely expel the dissolved gluten and the steep-water from the tissue. I follow up the removal of the impure steep-water by a stream of pure water. This operation of steeping and expelling the steep-water may be repeated until purity is obtained or until loss of starch forbids. The starchy portion of the grain, treated as above stated, is now ground, crushed, or disintegrated and sifted in the usual manner.

The starch, as ordinarily sifted wet through the silk bolts, is contaminated with (principally soluble) glutinous matter, which, however, by its exposure to the air, is soon rendered practically insoluble, and resists washing out. This shows the advantage of freeing the berry not only from hulls and germs, but, by centrifugal or other suitable contrivance, of soluble gluten, at as early a stage as possible. The starch thus produced at first settling in the trough is much purer than that after repeated washings in the ordinary mode of operation. This pure starch by drying may be turned into an article of commerce or converted into glucose, dextrine, or starch-sugar. For completing the production of glucose, I now treat the starch with acid in the usual manner until the glucose is formed. Lime is then added to neutralize the acid, and where sulphuric acid was used sulphate of lime is precipitated; but I have found that sulphate of lime, in proportion of one part in two hundred to three hundred of glucose, remains dissolved in the latter after the neutralization of the sulphuric acid by lime, and that this remnant of sulphate of lime, though small, yet acts detrimentally upon the system of the consumers of the article. To destroy this remnant I add oxalic acid in solution, which should be well stirred in; but it should not be used in excess. A trace rather less than sufficient to precipitate all the lime as oxalate might be employed. The test of sufficiency is when the oxalic acid ceases to form precipitate in the clear liquid. An excess of oxalic acid in the liquid is discovered and destroyed by the addition of lime-water. The sulphuric acid liberated from the lime by the use of oxalic acid is then neutralized by a proportionate addition of soda or carbonate of soda, producing sulphate of soda. For the injurious sulphate of lime is thus substituted an equivalent proportion of perfectly harmless sulphate of soda, not even detectable by taste in the small proportion of about one-half of one per cent. in which it will remain in the finished article of glucose or sugar.

The same process is equally applicable for the removal of sulphate of lime from commercial sirups other than glucose from grain that has been treated with sulphuric acid and neutralized with lime.

I do not claim the removal of hulls and germs from the other starchy portions of the grain as such, for, wet and dry, this has previously been done; nor do I broadly claim the use of oxalic acid or soda, except in the connection described.

I claim—

1. The process of treating corn in the manufacture of glucose, which consists in first steeping the corn, next removing the hulls and germs from the steeped corn, and in then ejecting by centrifugal apparatus from the starchy portion of the kernel the adhering soluble gluten previous to the wet grinding and sifting of the corn, substantially as and for the purpose described.

2. The process of manufacturing glucose from grain, said process consisting in first steeping the grain, next removing the hulls and also the germs from the steeped grain, then ejecting the soluble gluten from the starchy portion of the kernel, next grinding or crushing the rest and settling the starch, and in then treating the starch with acid until converted, and finally neutralizing the acid, as specified.

3. In the manufacture of glucose or starch-sugar from grain, or of other sirups, the process of eliminating the trace or remnant of sulphate of lime, which process consists in first adding oxalic acid and then soda to the glucose, substantially as specified.

R. D'HEUREUSE.

Witnesses:
A. V. BRIESEN,
WILLY G. E. SCHULTZ.